Figure 1:
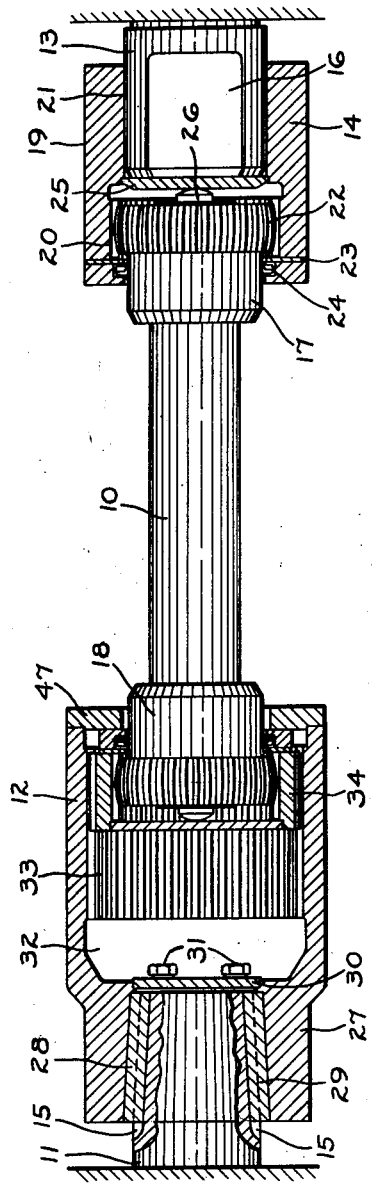

Nov. 6, 1956    J. M. O'MALLEY    2,769,323
COUPLING

Filed Oct. 25, 1954    2 Sheets-Sheet 1

INVENTOR.
Joseph M. O'Malley
BY
Norman S. Blodgett
Attorney

INVENTOR.
Joseph M. O'Malley
BY Norman S. Blodgett
Attorney

United States Patent Office 2,769,323
Patented Nov. 6, 1956

2,769,323

COUPLING

Joseph M. O'Malley, Worcester, Mass., assignor to Morgan Construction Company, Worcester, Mass., a corporation of Massachusetts Application October 25, 1954, Serial No. 464,202

10 Claims. (Cl. 64—8)

This invention relates to a coupling and more particularly to means for joining two rotatable shafts where considerable power is to be transmitted and considerable misalignment may take place. In situations where it is desirable to transmit considerable torque from a driving shaft to a driven shaft, a condition of misalignment is sometimes encountered. Such a situation exists, for example, in the transmission of power from the mill pinions to the spindles and from the spindles to the rolls of a rolling mill. The spherical gear coupling, as shown in the patent to Myles Morgan No. 2,136,947, overcomes many of the difficulties encountered in such an installation. However, it is very often necessary to disconnect the spindle from the roll neck without removing it from the pinion shaft; this may be desirable when changing rolls in an open top housing or when changing an entire housing with its rolls and furniture, as is sometimes the case. Furthermore, when dummying a mill stand, it is necessary to remove the spindles and couplings from the pinion shaft, lest they thrash about idly and dangerously. To accomplish these ends, it has been the practice to provide a recess in the coupling at the pinion end of the spindle to permit withdrawal of the spindle toward the pinion a sufficient distance to slide the roll end coupling box from the roll end. To prevent this withdrawal movement from taking place during the normal operation of the mill, it was necessary to use a means of locking the roll end coupling box to the roll end. The result was that this type of construction is awkward to manipulate and leads to a longer time for roll changes and the like; since the mill is not operating during such changes, this lengthened down-time is very expensive from an operating point of view. The present invention obviates these and other difficulties experienced with the prior-art devices.

It is therefore an outstanding object of the present invention to provide an easily-removed coupling particularly suitable for driving rolling mills and capable of transmitting heavy torques under conditions of appreciable misalignment.

It is a further object of this invention to provide a rolling mill spindle coupling which will operate quietly and under severe operating conditions throughout a long life of service.

It is a further object of the invention to provide a rolling mill spindle and coupling which will be comparatively simple and inexpensive to manufacture.

It is a further object of this invention to provide a rolling mill spindle and coupling so constructed and arranged that the rolls can easily be changed or the spindle removed in a simple and expeditious manner.

It is a still further object of the present invention to provide a coupling having relatively movable parts which can be properly lubricated and enclosed and which can remain enclosed when the coupling is disconnected from the driving or driven elements.

A still further object of this invention is the provision of a rolling mill spindle coupling so constructed and arranged that the rolls can easily be changed or the spindle removed without disassembling or exposing the enclosed and lubricated parts.

Another object of the instant invention is the provision of an easily-removed coupling of the external and internal gear type which will operate satisfactorily despite substantial misalignment of the driving and driven shafts.

Another object of the invention is the provision of a rolling mill spindle construction permitting maximum torque transmission with maximum misalignment in which the withdrawal of the spindle from the roll neck and the removal of the spindle from both the roll neck and the pinion shaft is accomplished in a very short time without sacrifice of operating quality.

With these and other objects in view, as will be apparent to those skilled in the art, the invention resides in the combination of parts set forth in the specification and covered by the claims appended hereto.

Figure 2:
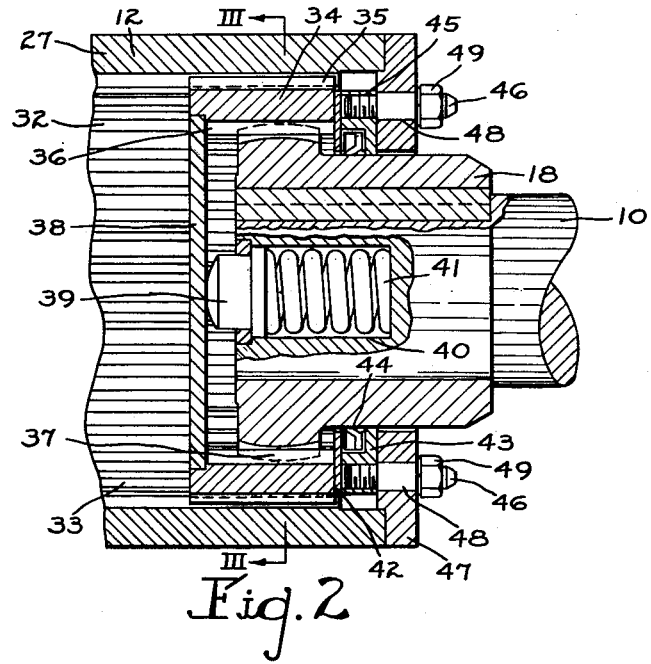
Figure 3:
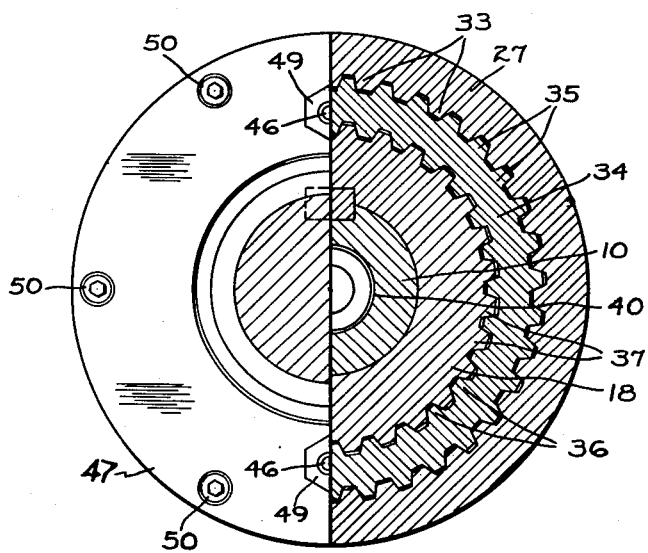

The character of the invention, however, may be best understood by reference to certain of its structural forms, as illustrated by the accompanying drawings in which:

Figure 1 is a longitudinal sectional view of apparatus embodying the principles of the present invention, Figure 2 is an enlarged view of a portion of the apparatus shown in Figure 1 further sectionalized, and Figure 3 is a sectional view taken on the line III—III of Figure 2.

Referring to Figure 1, wherein is best shown the general features of the invention, a rolling mill spindle 10 is shown as connected at one end to a pinion shaft 11 by means of a coupling 12 and to a roll neck 13 by means of a coupling 14. The pinion shaft 11 is tapered and is provided with keyways 15, while the roll neck 13 is provided in the usual manner with an irregular wabbler section 16. The spindle 10 is provided at the roll neck end with a head 17 and at the pinion end with a head 18.

The coupling 14 comprises a coupling box 19 having internal gear teeth 20 having a cylindrical pitch surface. For the purposes of this discussion the "pitch surface" of a gear is defined as the surface defined by the pitch circles of successive cross-sections of the gear taken on planes perpendicular to the axis thereof. A bore 21 is provided of irregular cross-section such as to fit the wabbler section 16 with a sliding fit. The head 17 of the spindle is provided with gear teeth 22 having a spherical pitch surface for engagement with the gear teeth 20 in the box. The box 19 is fixed to the head 17 of the spindle by means of a locking ring 23 and a seal 24 is provided therebetween to prevent the leakage of lubricant. The inner end of the bore 21 is closed by means of a welded plate 25 and a button 26 having a spherical end extends axially from the end of the head 17 and the spindle for contact with the center of the plate 25.

The coupling 12 comprises a coupling box 27 having a tapered bore 28 adapted to fit over the pinion shaft 11, the bore having ridges 29 which fit into the keyways 15. A plate 30 is fastened to the outer end of the pinion shaft by means of screws 31 and serves to draw the shaft and the coupling box together tightly. The other end of the coupling box is provided with an elongated recess 32 which is provided along a considerable portion of its length with internal gear teeth 33 having a cylindrical pitch surface. Within the recess 32 resides a sleeve 34 and within the sleeve is situated the head 18 of the spindle.

Referring next to Figure 2, it is to be noted that the sleeve 34 is considerably shorter than the recess 32 and that it is provided externally with gear teeth 35 having a cylindrical pitch surface. The interior of the sleeve 34 is provided with internal gear teeth 36 having a cylindrical pitch surface. The head 18 of the spindle is provided with external gear teeth 37, having a spherical pitch surface, that are adapted to mate with the teeth 36 of the sleeve 34. A plate 38 closes the inner end of the sleeve 34 and is contacted by a button 39 extending axially from the spindle 10. The button is slidably received in a bore 40 in the spindle and is biased outwardly by a coil spring 41. The head 18 is formed separately of the spindle 10 proper and the two elements are keyed together. A washer-like disk 42 is arranged at the outer end of the sleeve 34 and has an inner edge which resides in close proximity to a cylindrical portion of the head 18. An annular clamping member 43 is situated at the outer side of the disk 42 and is provided with a flange which extends radially inwardly to adjacent the cylindrical portion of the head. The sleeve 34, the disk 42 and the clamping member 43 are held together by screws passing therethrough, the screws not being shown in the drawings. An oil seal 44 is mounted between the disk 42 and the inwardly-extending flange of the clamping member 43. The clamping member is provided with a number of threaded apertures 45 and in these apertures are mounted studs 46 which extend axially of the spindle. A cover plate 47 is provided of the same diameter as the coupling box 27 and formed to fit snugly against the spindle end of the box. It is provided with apertures 48 which are aligned with corresponding apertures 45 in the clamping member 43. Nuts 49 are operatively mounted on the studs 46 during normal operation.

Referring next to Figure 3, it can be seen that the cover 47 is fastened to the coupling box 27 by means of recessed-head screws 50. This figure of the drawings shows particularly well the relationship of the parts and the manner of meshing of the various gear teeth.

The operation of the apparatus will now be clearly understood in view of the above description. Power arrives at the pinion shaft 11 and is transmitted through the keyways 15 and the ridges 29 into the coupling box 27. Power is transmitted to the sleeve 34 through the meshed gear teeth 33 and 35. The sleeve, in turn, drives the head 18 through the medium of the meshed gear teeth 36 and 37. Power reaches the spindle 10 proper, since the head is keyed thereto. The power passes to the head 17, since the spindle is keyed thereto and the spherical gear teeth on the head mesh with the cylindrical gear teeth on the coupling box 19. Since the bore 21 of the box and the wabbler section 16 of the rolls are irregularly shaped, the power is ultimately delivered to the roll. As the rolls are adjusted and their surfaces are ground, they move toward and away from each other; this means that they are definitely not aligned with the pinion shaft and there is misalignment to be compensated for within the spindle and couplings. This misalignment is well taken care of by the spherical gear teeth in the spindle heads; it is the nature of this type of coupling to permit considerable angularity without loss of power transmitting ability. When it is necessary to withdraw the spindle from the mill roll, as when a roll change is to be made, it is only necessary to remove the nuts 46. When this is done, the clamping member 43 and the sleeve 34 may be moved inwardly within the bore 32 of the coupling box 27. This is possible because of the sliding action between the gear teeth 33 and 35. The whole spindle moves with the sleeve 34 since the head 18 is enclosed within the sleeve by the disk 42. Furthermore, the coupling box 19 is mounted on the wabbler section 16 of the mill roll by only a sliding fit and is easily removed. The cover 47 remains in its position of attachment to the end of the coupling box 27. It is the usual practice to support the main body of the spindle on a cradle or the like during this operation. Now, if it is desired to remove the spindle altogether, as when the mill stand is to be dummied, it is necessary only to remove the cover 47 by removing the screws 50. The entire assembly of sleeve 34, clamping member 43 and head 18 may then be moved axially outwardly and the spindle is free.

It is obvious that minor changes may be made in the form and construction of the invention without departing from the material spirit there. It is not, however, desired to confine the invention to the exact form herein shown and described, but it is desired to include all such as properly come within the scope claimed.

The invention having been thus described, what is claimed as new and desired to secure by Letters Patent is:

1. A coupling comprising a coupling box for attachment to a driving shaft, a head for attachment to a driven shaft, a sleeve supported for sliding motion on occasion within the said box, the said head being mounted in driving relation within the sleeve, and means for preventing sliding movement between the sleeve and box during normal operation.

2. A coupling comprising a coupling box adapted to be attached to a driving shaft, the box having an elongated bore therein, a head for attachment to a driven shaft, a relatively short sleeve longitudinally slidably supported for longitudinal sliding motion on occasion within the bore of the box, the said head being mounted in driving relation without the capability of appreciable longitudinal sliding within the sleeve, and means for preventing sliding movement between the sleeve and box during normal operation.

3. A coupling comprising a coupling box for attachment to a driving shaft, a head for attachment to a driven shaft, a short sleeve non-rotatably supported for sliding motion on occasion within the said box and having internal gear teeth of cylindrical pitch surface, the said head having external gear teeth of spherical pitch surface being mounted in driving relation within the sleeve with the gears in operative relation, and means for preventing sliding movement between the sleeve and box during normal operation.

4. A coupling comprising a coupling box adapted to be attached to a driving shaft, the box having an elongated bore therein, the surface of the bore being provided with gear teeth of cylindrical pitch surface, a head for attachment to a driven shaft, a sleeve supported for sliding motion on occasion within the box, the sleeve being provided with gear teeth of cylindrical pitch surface which engage the teeth of the coupling box, the sleeve being considerably shorter than the bore, the said head being mounted in driving relation with the sleeve, and means for preventing sliding movement between the sleeve and box during normal operation.

5. A coupling comprising a coupling box adapted to be attached to a driving shaft, the box having an elongated bore therein, the surface of the bore being provided with gear teeth of cylindrical surface, a head for attachment to a driven shaft, a sleeve supported for sliding motion on occasion within the box, the sleeve being provided with gear teeth of cylindrical pitch surface which engage the teeth of the coupling box, the said head having external gear teeth of spherical pitch surface, being mounted in driving relation without the capability of appreciable longitudinal sliding within the sleeve with their gear teeth in operative relation and means for preventing sliding movement between the sleeve and box during normal operation.

6. A coupling for a rolling mill drive for use between a pinion shaft and the wabbler section of the mill roll, said drive having an elongated spindle and a universal sliding coupling between one end of the spindle and said wabbler section, comprising a coupling box adapted to be fastened to the pinion shaft, the box having an elongated bore therein, a head adapted to be mounted on the other end of the spindle, a sleeve having an external surface associated with the bore in the box and capable on occasion of sliding movement longitudinally of the bore and an internal surface engaging the said head for universal movement relative thereto without the capability of appreciable longitudinal sliding, and means for preventing the said sliding movement during power transmitting operation.

7. A coupling for a rolling mill drive for use between a pinion shaft and the wabbler section of the mill roll, said drive having an elongated spindle and a universal sliding coupling between one end of the spindle and the said wabbler section, comprising a coupling box adapted to be fastened to the pinion shaft, the box having an elongated bore therein, a head adapted to be mounted on the other end of the spindle, a sleeve having an external surface associated with the bore in the box and capable on occasion of sliding movement longitudinally of the bore and an internal surface engaging the said head without the capability of appreciable longitudinal sliding, the length of the sleeve in the direction of the bore being considerably less than the length of the bore universal movement relative thereto, and means for preventing the said sliding movement during power transmitting operation.

8. A coupling for a rolling mill drive for use between a pinion shaft and the wabbler section of the mill roll, said drive having an elongated spindle and a universal sliding coupling between one end of the spindle and the said wabbler section, comprising a coupling box adapted to be fastened to the pinion shaft, the box having an elongated bore with gear teeth therein, a head adapted to be mounted on the other end of the spindle, a sleeve having an external surface provided with gear teeth associated with the bore in the box and capable on occasion of sliding movement longitudinally of the bore and an internal surface engaging the said head for universal movement relative thereto without the capability of appreciable longitudinal sliding, and means for preventing the said sliding movement during power transmitting operation.

9. A coupling for a rolling mill drive for use between a pinion shaft and the wabbler section of the mill roll, said drive having an elongated spindle and a universal sliding coupling between one end of the spindle and the said wabbler section, comprising a coupling box adapted to be fastened to the pinion shaft, the box having an elongated bore therein, a head adapted to be mounted on the other end of the spindle, said head having external spherical gear teeth thereon, a sleeve having an external surface associated with the bore in the box and capable on occasion of sliding movement longitudinally of the bore and an internal surface provided with gear teeth engaging the said head for universal movement relative thereto without the capability of appreciable longitudinal sliding, and means for preventing the said sliding movement during power transmitting operation.

10. A coupling for a rolling mill drive for use between a pinion shaft and the wabbler section of the mill roll, said drive having an elongated spindle and a universal sliding coupling between one end of the spindle and the said wabbler section, comprising a coupling box adapted to be fastened to the pinion shaft, the box having an elongated bore therein provided with gear teeth of cylindrical pitch surface, a head adapted to be mounted on the other end of the spindle, said head having external gear teeth thereon of spherical pitch surface, a sleeve having an external surface provided with gear teeth of cylindrical pitch surface associated with the bore in the box and capable on occasion of sliding movement longitudinally of the bore and an internal surface provided with gear teeth of cylindrical pitch surface engaging the said head for universal movement relative thereto without the capability of appreciable longitudinal sliding, and means for preventing the said sliding movement during power transmitting operation.

References Cited in the file of this patent

UNITED STATES PATENTS

| | | |
|---|---|---|
| 2,136,947 | Morgan | Nov. 15, 1938 |
| 2,372,289 | O'Malley | Mar. 27, 1945 |